(12) United States Patent
Song et al.

(10) Patent No.: US 7,727,447 B2
(45) Date of Patent: *Jun. 1, 2010

(54) PRODUCT HAVING SEALED FREE EDGES AND METHOD TO PRODUCE THE PRODUCT

(75) Inventors: Hai-Min Song, Shenzhen (CN); Shih-Ming Liu, Tu-Cheng (TW); Wei Zou, Shenzhen (CN); Wen-Che Chen, Tu-Cheng (TW); Hsin-Pei Chang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1210 days.

This patent is subject to a terminal disclaimer.

(21) Appl. No.: 11/143,364

(22) Filed: Jun. 2, 2005

(65) Prior Publication Data
US 2006/0093837 A1    May 4, 2006

(30) Foreign Application Priority Data
Oct. 30, 2004    (CN) .................... 2004 1 0052066

(51) Int. Cl.
*B29C 45/14*    (2006.01)
*B29C 70/76*    (2006.01)

(52) U.S. Cl. .................. 264/250; 264/252; 264/275; 264/572

(58) Field of Classification Search .................. None
See application file for complete search history.

(56) References Cited

U.S. PATENT DOCUMENTS

| D430,155 S | 8/2000 | Cronk | |
|---|---|---|---|
| 6,327,142 B1 | 12/2001 | Cronk | |
| 2007/0131012 A1* | 6/2007 | Eipper et al. | ............ 72/46 |

FOREIGN PATENT DOCUMENTS

| CN | 1181310 A | 5/1998 |
|---|---|---|
| CN | 1469962 A | 1/2004 |
| TW | 447729 | 7/2001 |

* cited by examiner

*Primary Examiner*—Edmund H. Lee
(74) *Attorney, Agent, or Firm*—Zhigang Ma

(57) ABSTRACT

A method to produce a product includes the steps of: providing a mold including an upper mold (40) and a lower mold (30), the upper mold defining a plurality of through holes (43); providing a metal piece (10), a hot melt adhesive, and a nonmetal cover layer (50) between the upper and lower molds, the hot melt adhesive arranged between the hot melt adhesive and the cover layer; closing the mold; heating the mold to melt the hot melt adhesive; conducting high-pressure gas into the mold via the through holes to press the cover layer toward the metal piece; opening the mold to pick up an intermediary product having the metal piece and the cover layer attached thereto by means of the adhesive; and applying a sealing layer (60) which joins corresponding free edges of the metal piece and the cover layer to the intermediary product through injection molding technology.

18 Claims, 6 Drawing Sheets

PRODUCT HAVING SEALED FREE EDGES AND METHOD TO PRODUCE THE PRODUCT

CROSS-REFERENCE TO RELATED APPLICATION

Relevant subject matter is disclosed in U.S. patent applications with application Ser. No. 11/143,832, filed on Jun. 2, 2005 now abandoned and entitled "METHOD FOR ATTACHING A NONMETAL COVER LAYER TO A METAL PIECE, A MOLD USED IN THE METHOD AND A PRODUCT PRODUCED WITH THE METHOD", and with application Ser. No. 11/143,843, filed on Jun. 2, 2005 now U.S. Pat. No. 7,563,338 and entitled "METHOD FOR ATTACHING A NONMETAL COVER LAYER TO A WORKPIECE, A MOLD USED IN THE METHOD AND A PRODUCT PRODUCED WITH THE METHOD", assigned to the same assignee as this application.

BACKGROUND OF THE INVENTION

1. Field of the Invention

The present invention relates to a product which has sealed free edges, and a method to produce the product.

2. General Background

Portable computers, such as laptop computers and notebook computers, have become increasingly popular for general use. Manufacturers are striving to design varieties of portable computers to please users.

As Taiwan Patent No. 447729 teaches a portable computer which has a leather cover layer attached to an enclosure thereof via screws. However, the cover layer is liable to peel off due to missing of the screws. Furthermore, edges of the cover layer are liable to wrap off due to loose engagement between the edges of the cover layer and the enclosure. Moreover, the cover layer can not be smoothly and tightly attached to the enclosure of the portable computer by using screws, wrinkles may be formed on the cover layer, such that the appearance of the enclosure is less pleasing.

What is desired, therefore, is a product including a cover layer which has improved duration of life and pleasing appearance. What is also needed is a method to produce the product.

SUMMARY

In one preferred embodiment, a product includes a metal piece, a hot melt adhesive heated to adhere to the workpiece, a nonmetal cover layer covering the metal piece and adheringly sandwiching the adhesive in cooperation with the metal piece, and a sealing layer joining corresponding free edges of the metal piece and the cover layer.

In another preferred embodiment, a method to produce a product includes the steps of: providing a mold including an upper mold and a lower mold, the upper mold defining a plurality of through holes; providing a metal piece, a hot melt adhesive, and a nonmetal cover layer between the upper and lower molds, the hot melt adhesive arranged between the hot melt adhesive and the cover layer; closing the mold; heating the mold to melt the hot melt adhesive; conducting high-pressure gas into the mold via the through holes to press the cover layer toward the metal piece; opening the mold to pick up an intermediary product having the metal piece and the cover layer attached thereto by means of the adhesive; and applying a sealing layer which joins corresponding free edges of the metal piece and the cover layer to the intermediary product through injection molding technology.

Other advantages and novel features will become more apparent from the following detailed description of preferred embodiments when taken in conjunction with the accompanying drawings, in which:

DETAILED DESCRIPTION OF THE EMBODIMENTS

In a preferred embodiment of the invention, a product, which includes a metal piece 10 and a nonmetal cover layer 50 attached to the metal piece 10, is produced with a molding method in which a mold is used. The metal piece 10 may be, for example, a part of an electronic device enclosure.

Figure 1:
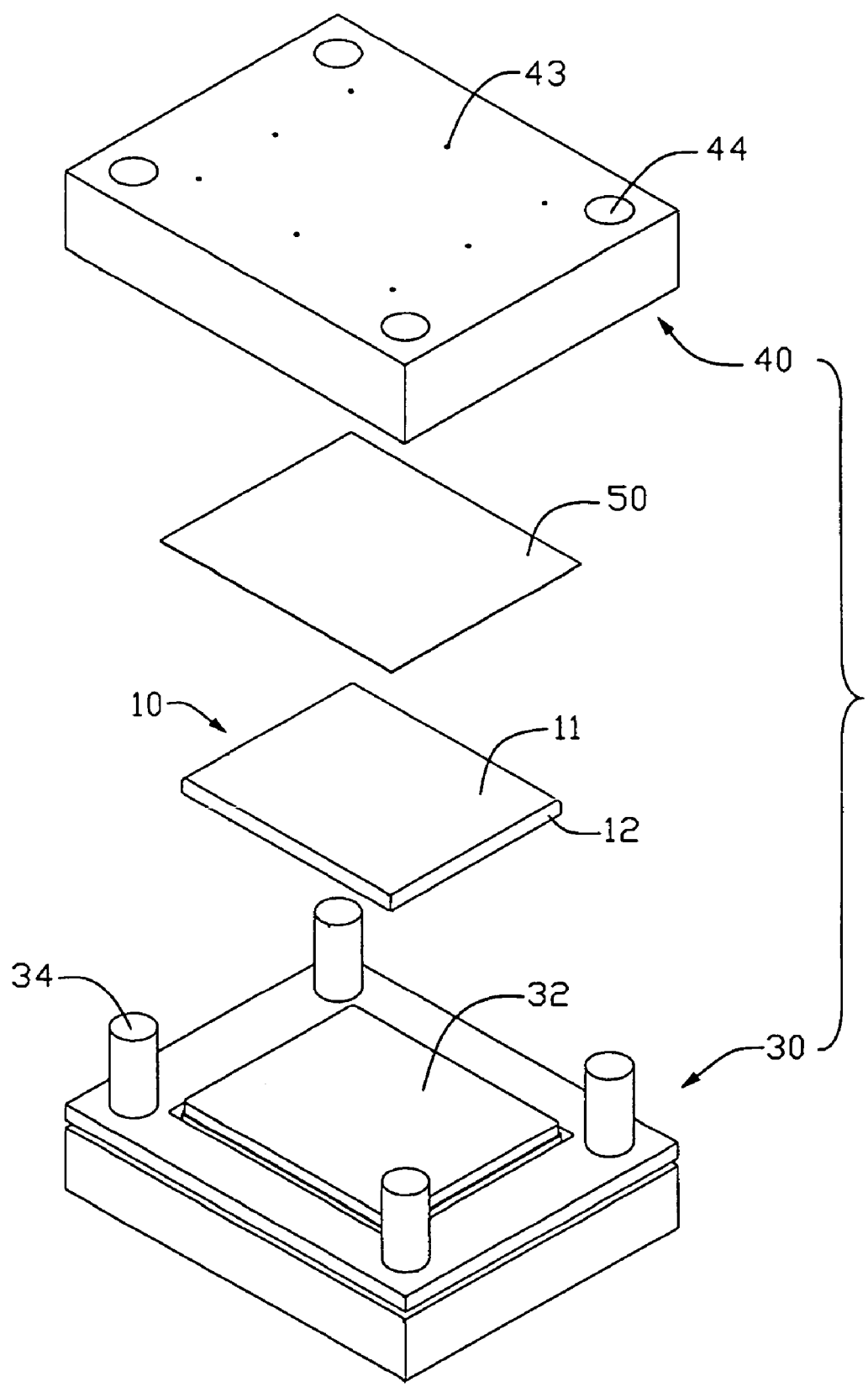
FIG. 1 is an exploded, isometric view of a mold, a metal piece and a cover layer in accordance with a preferred embodiment of the present invention.
Figure 2:
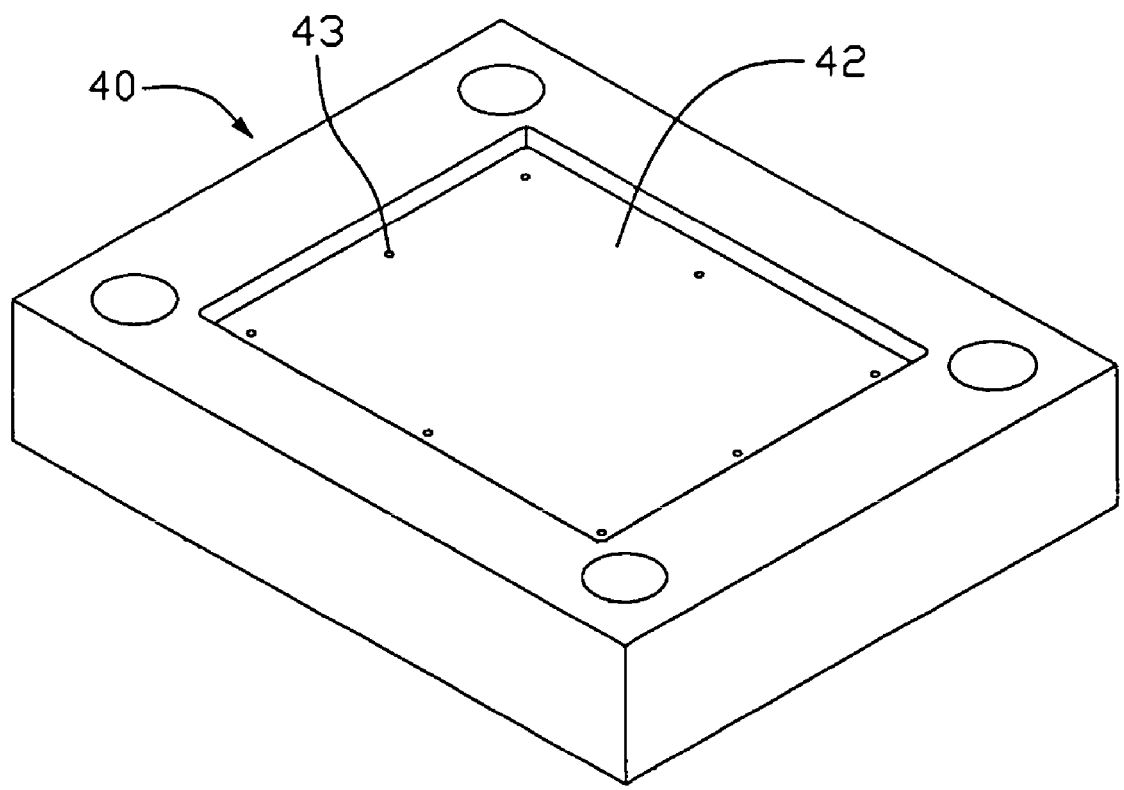
FIG. 2 is an isometric view of an upper mold of the mold of FIG. 1, but viewed from another aspect.

Referring to FIGS. 1 and 2, the metal piece 10 includes a rectangular top panel 11, and four lateral panels 12 depending from four edges of the top panel 11. The metal piece 10 includes, for example, magnesium alloy piece, aluminum alloy piece, and zinc alloy piece. In the preferred embodiment, magnesium alloy piece is selected to illustrate the invention.

The mold includes an upper mold 40 and a lower mold 30 in cooperation with the upper mold 40. A central supporting member 32 protrudes beyond a top surface of the lower mold 30, a surrounding groove is thereby defined in the lower mold 30 adjacent the supporting member 32. The supporting member 32 is shaped for insertion into a space of the metal piece 10 defined by the top panel 11 and the lateral panels 12 thereof. Four guide posts 34 protrude perpendicularly from four corners of the top surface of the lower mold 30 respectively.

Referring particularly to FIG. 2, the upper mold 40 defines a cavity 42 in a bottom surface thereof. A plurality of through holes 43 is defined in the upper mold 40 and communicates with the cavity 42. Four guide apertures 44 are defined at four corners of the upper mold 40, corresponding to the guide posts 34 of the lower mold 30.

A conventional heating system (not visible) is also embedded in the mold, for heating the upper and lower molds 40, 30 to a predetermined temperature.

The cover layer 50, in the preferred embodiment, is a one-piece leather layer. The cover layer 50 can also be, for examples, cloth layer and other material layer formed of natural or synthetic fibers.

Figure 7:
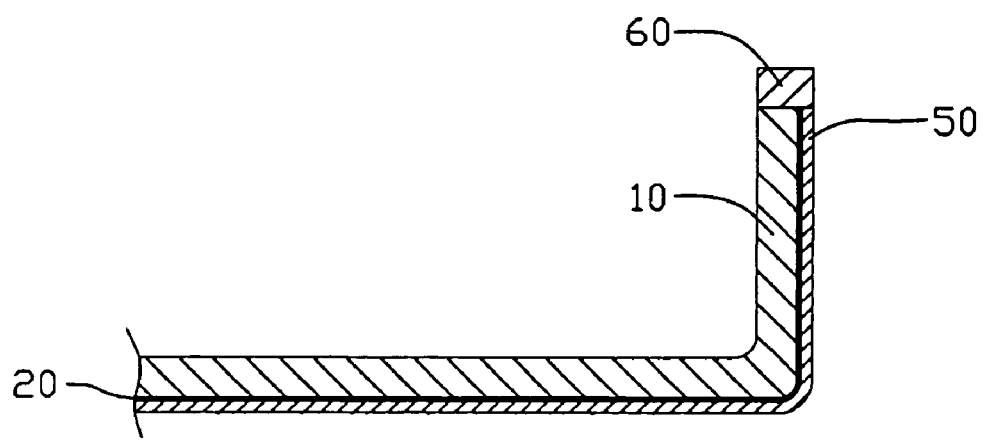
FIG. 7 is a cross-sectional view of part of the finished product of FIG. 6, taken along line VII-VII thereof.
Figure 8:
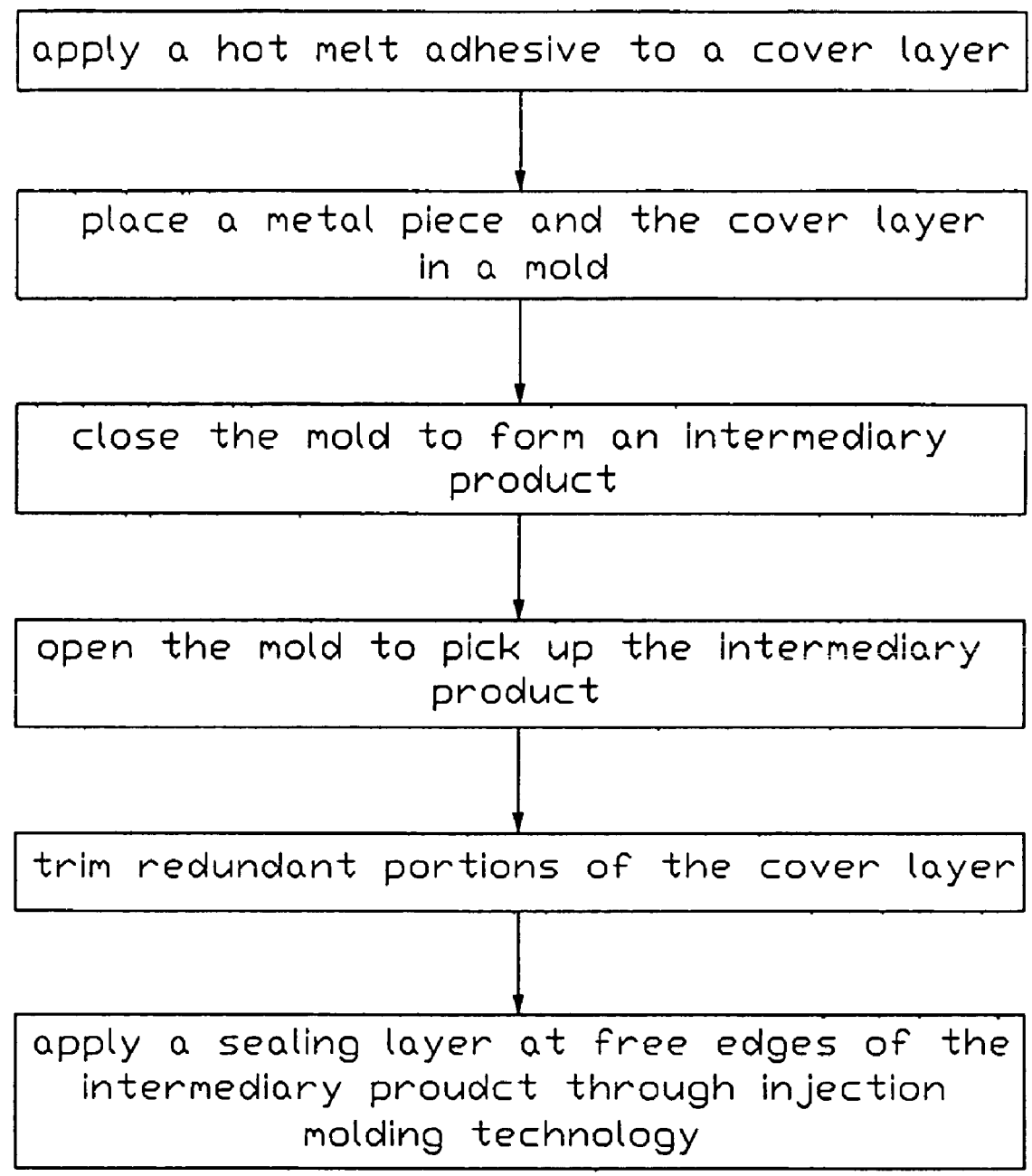
FIG. 8 is a flowchart of a method to produce a product including the metal piece covered with the cover layer of FIG. 1.

With reference to FIG. 8, to attach the cover layer 50 to the metal piece 10, a piece of plate-shaped hot melt adhesive 20 (see FIG. 7), which can be, for example, ethylene-vinylacetate copolymer, acryl, polyurethane, polyamide, polyester, and a copolymer of at least two materials selected from the group consisting of ethylene-vinylacetate copolymer, acryl, polyurethane, polyamide and polyester, is applied to an undersurface of the cover layer 50.

The upper and lower molds 40, 30 are heated with the heating system respectively, the cavity 42 of the upper mold 40 is heated to a temperature ranged from 60 to 200 degrees centigrade, the supporting member 32 is heated to a temperature ranged from 60 to 200 degrees centigrade, and the temperature of at least one of the upper and lower molds 40, 30 is beyond melting point of the hot melt adhesive 20 but never too high to damage the cover layer 50.

Figure 3:
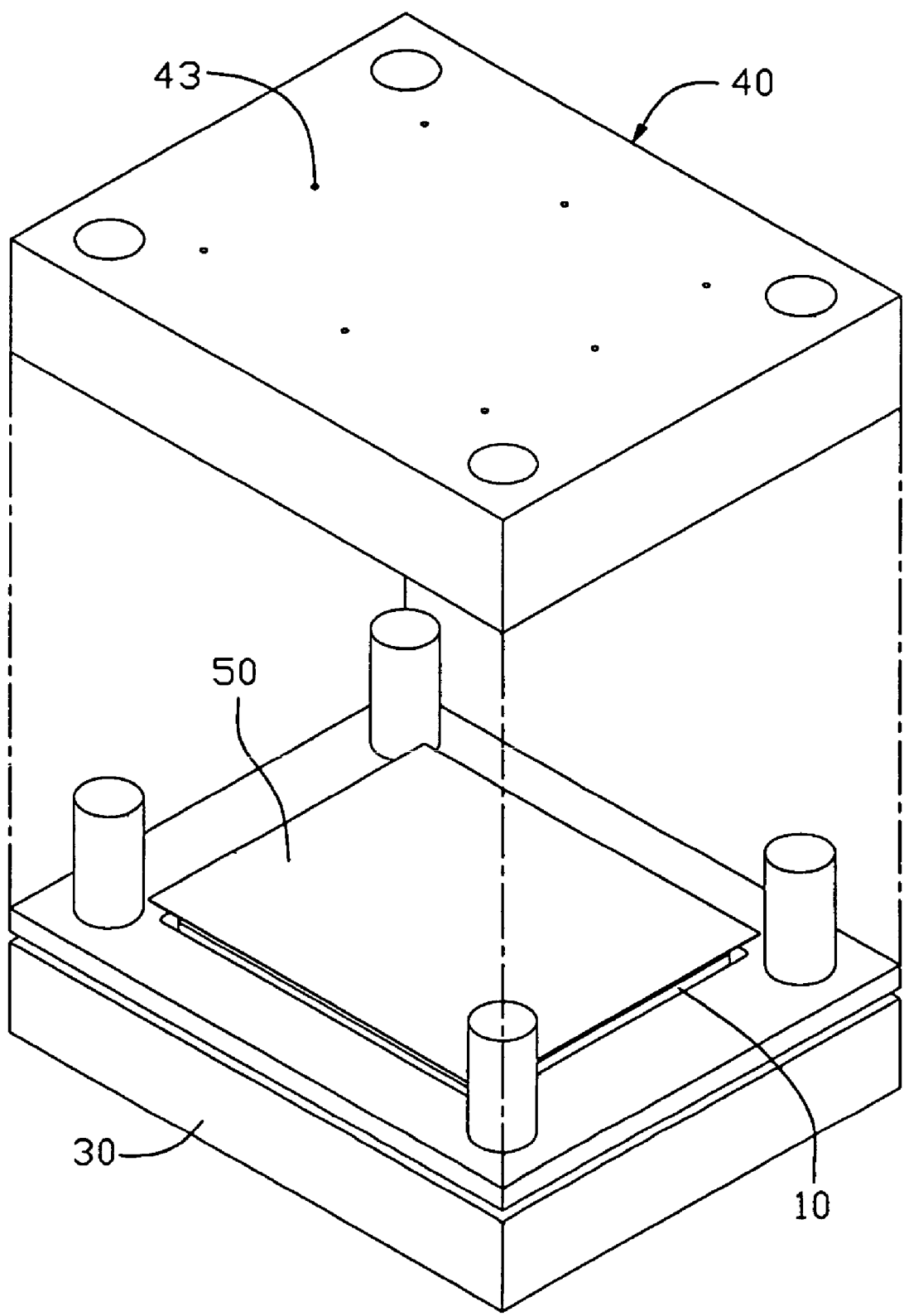
FIG. 3 is similar to FIG. 1, showing the metal piece and the cover layer is disposed on a lower mold of the mold of FIG. 1.

Referring particularly to FIG. 3, the metal piece 10 is placed on the supporting member 32 of the lower mold 30, and the supporting member 32 is generally received in the metal piece 12. The cover layer 50 is then placed on the top panel 11 of the metal piece 10, and the undersurface of the cover layer 50 contacts the supporting member 32, with edge portions of the cover layer 50 extending out of a periphery of the supporting member 32. The cover layer 50 may alternatively be located on the upper mold 40, with the undersurface thereof facing the top panel 11 of the metal piece 10.

Figure 4:
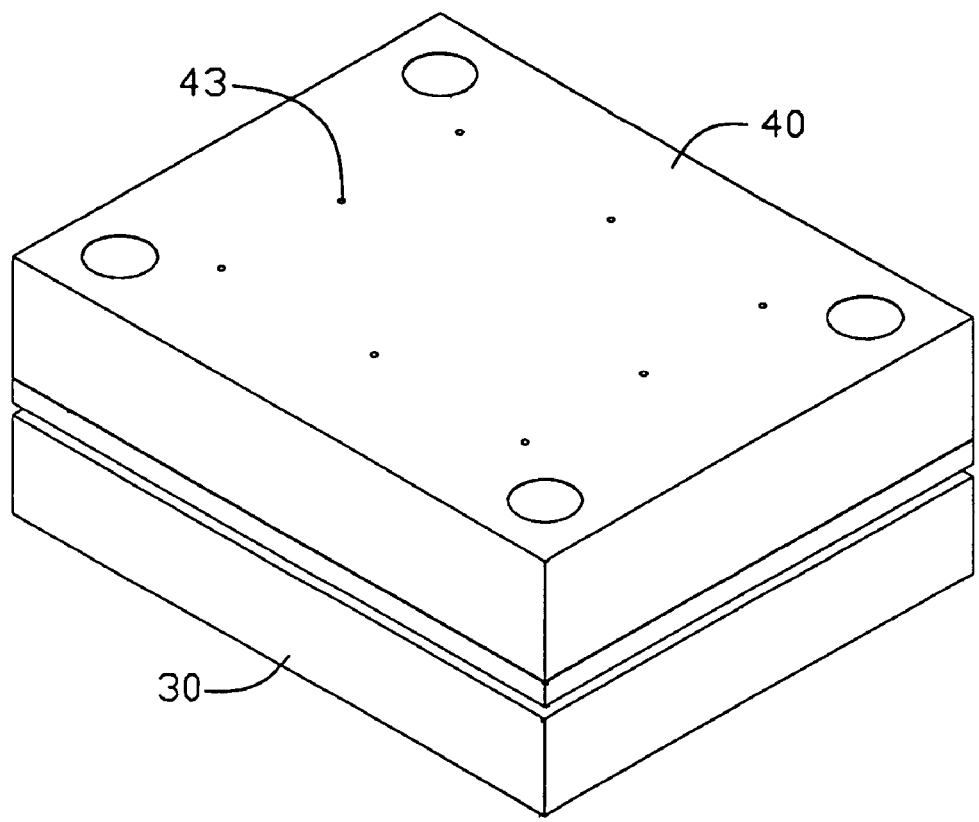
FIG. 4 is similar to FIG. 3, showing the mold is closed.

The upper mold 40 is moved toward the lower mold 30 to close the mold, with the guide posts 34 of the lower mold 30 relatively sliding in corresponding apertures 44 of the upper mold 40. FIG. 4 shows the upper mold 40 engages the lower mold 30. The metal piece 10 is accommodated in the cavity 42 of the upper mold 40. High-pressure gas is conducted in the cavity 42 of the upper mold 40 via through holes 43. High-pressure gas blows and presses the cover layer 50 toward the metal piece 10 to evenly and tightly engage the top panel 11 of the metal piece 10, and the edge portions of the cover layer 50 extending beyond the periphery of the supporting member 32 are blew to bend downward and tightly enclose the lateral panels 12 of the metal piece 10. The hot melt adhesive 20 is melted by heat conducted from the upper and lower molds 40, 30, and the cover layer 50 tightly adheres to the top panel 11 and the lateral panels 12 of the metal piece 10 by means of the melted hot melt adhesive 20. The upper mold 40 is separated from the lower mold 30, and the metal piece 10 having the cover layer 50 attached thereto is picked up.

In an alternative embodiment, after the metal piece 10 is placed on the supporting member 32 of the lower mold 30, the hot melt adhesive 20 is placed on the metal piece 10 instead of being pre-attached to the undersurface of the cover layer 50, the cover layer 50 is then placed on the hot melt adhesive 20, the mold is finally closed.

Figure 5:
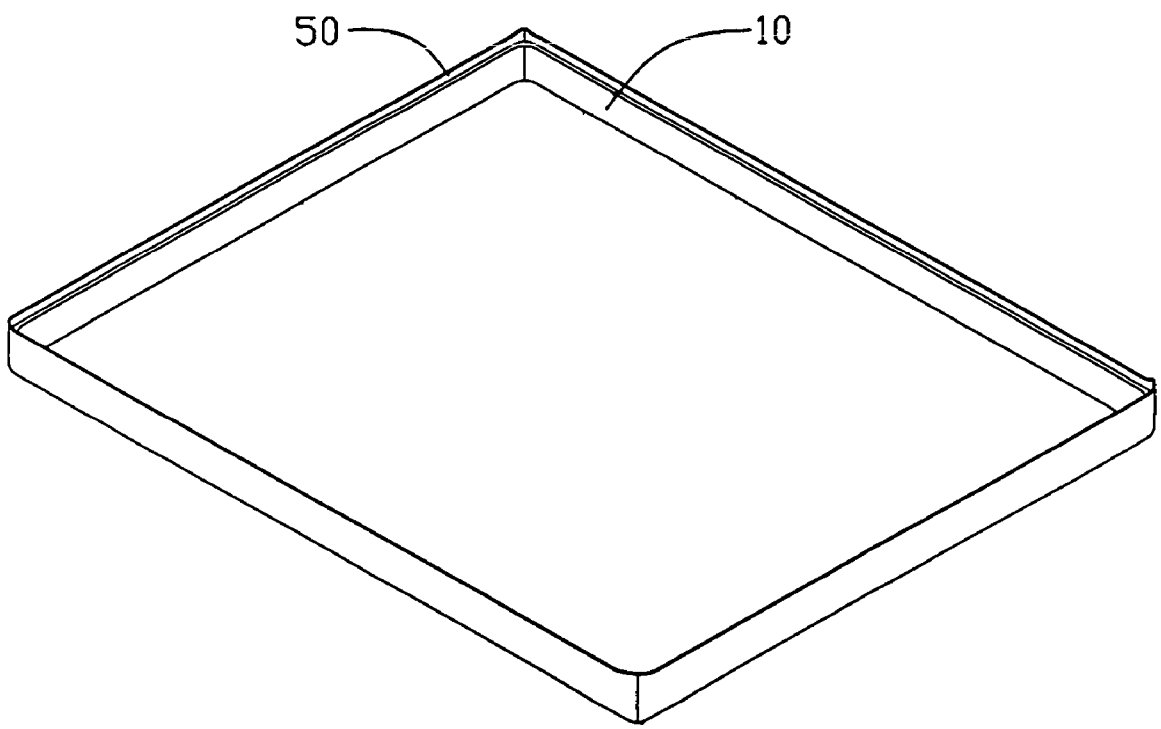
FIG. 5 is an isometric view of an intermediary product including the metal piece and the cover layer of FIG. 1.

FIG. 5 shows an intermediary product having the metal piece 10 and the cover layer 50 attached thereto produced from aforesaid steps. Redundant edge portions of the cover layer 50 extend beyond the lateral panels 12 of the metal piece 10.

The redundant edge portions of the cover layer 50 is trimmed off, the intermediary product is then moved to an injection molding machine. In the injection molding machine, a sealing layer 60 is applied to and covers free edges of the metal piece 10 and the cover layer 50 through injection molding technology. The sealing layer 60 can be thermoplastic elastomer, which includes, for example, styrene polyolefin, thermoplastic polyurethane, polyamide, polyester, polyether and thermoplastic silicon rubber, or thermoplastic, which includes, for example, polycarbonate, acrylonitrile-butadiene-styrene copolymer, high impact polystyrene, polymethyl methacrylate, polyolefin, polyester, polyamide, polyacetal, and a composite material of at least two materials selected from the group consisting of polycarbonate, acrylonitrile-butadiene-styrene copolymer, high impact polystyrene, polymethyl methacrylate, polyolefin, polyester, polyamide and polyacetal, or thermosetting plastic, which includes, for example, epoxy, polyurethane and silicon resin.

Figure 6:
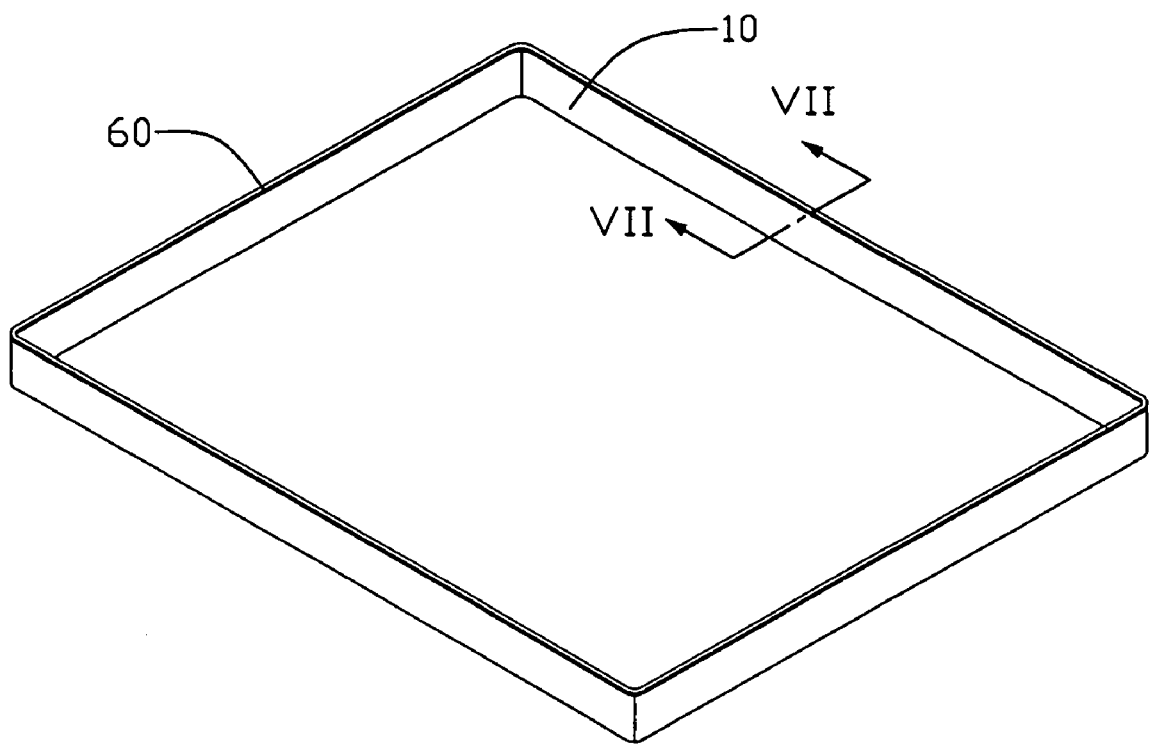
FIG. 6 is an isometric view of a finished product.

FIGS. 6 and 7 show finished product which includes the metal piece 10, the cover layer 50, the adhesive layer 20 arranged between the metal piece 10 and the cover layer 50, and the sealing layer 60 joining corresponding free edges of the metal piece 10 and the cover layer 50.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A method to produce a product, comprising:
   providing a mold comprising an upper mold and a lower mold, the upper mold defining a plurality of through holes;
   providing a metal piece, a hot melt adhesive, and a nonmetal cover layer between the upper and lower molds, the hot melt adhesive arranged between the metal piece and the cover layer;
   closing the mold;
   heating the mold to melt the hot melt adhesive;
   conducting high-pressure gas into the mold via the through holes to press the cover layer toward the metal piece;
   opening the mold to pick up an intermediary product having the metal piece and the cover layer attached thereto by means of the adhesive; and
   applying a sealing layer which joins corresponding free edges of the metal piece and the cover layer to the intermediary product through injection molding technology.

2. The method as claimed in claim 1, wherein the step of providing a metal piece, a hot melt adhesive, and a nonmetal cover layer between the upper and lower molds comprises placing the metal piece on the lower mold, attaching the hot melt adhesive to undersurface of the cover layer, and placing the cover layer on the metal piece.

3. The method as claimed in claim 1, wherein the step of providing a metal piece, a hot melt adhesive, and a nonmetal cover layer between the upper and lower molds comprises placing the metal piece on the lower mold, placing the hot melt adhesive on the metal piece, and placing the cover layer on the adhesive.

4. The method as claimed in claim 1, wherein the upper mold is heated to a temperature ranged from 60 to 200 degrees centigrade, the lower mold is heated to a temperature ranged from 60 to 200 degrees centigrade, and the temperature of at least one of the upper and lower molds is located beyond melting point of the hot melt adhesive.

5. The method as claimed in claim 4, wherein the adhesive is ethylene-vinylacetate copolymer, acryl, polyurethane, polyamide, polyester, or a copolymer of at least two materials selected from the group consisting of ethylene-vinylacetate copolymer, acryl, polyurethane, polyamide and polyester.

6. The method as claimed in claim 1, wherein the cover layer is a one-piece leather layer or cloth layer.

7. The method as claimed in claim 1, wherein the sealing layer is thermoplastic elastomer, thermoplastic, or thermosetting plastic.

8. The method as claimed in claim 7, wherein the thermoplastic elastomer is styrene polyolefin, thermoplastic polyurethane, polyamide, polyester, polyether or thermoplastic silicon rubber.

9. The method as claimed in claim 7, wherein the thermoplastic is polycarbonate, acrylonitrile-butadiene-styrene copolymer, high impact polystyrene, polymethyl methacrylate, polyolefin, polyester, polyamide, polyacetal, or a composite material of at least two materials selected from the group consisting of polycarbonate, acrylonitrile-butadiene-styrene copolymer, high impact polystyrene, polymethyl methacrylate, polyolefin, polyester, polyamide and polyacetal.

10. The method as claimed in claim 7, wherein the thermosetting plastic is epoxy, polyurethane or silicon resin.

11. A method to manufacture a decorated metal piece, comprising:
providing a mold capable of containing said metal piece;
placing a decorative layer between said mold and said metal piece;
attaching said decorative layer to said metal piece by adhering;
uniformly pressing said decorative layer toward said metal piece;
removing said mold from said metal piece having said decorative layer adhering thereon; and
sealing free edges of said metal piece and said decorative layer together by applying a sealing layer thereon.

12. The method as claimed in claim 11, wherein an adhesive is applied to allow said decorative layer to adhere to said metal piece.

13. The method as claimed in claim 12, wherein said adhesive is a hot melt adhesive, and said mold is heated to enable said decorative layer to adhere to said metal piece by said hot melt adhesive.

14. The method as claimed in claim 12, wherein pressing of said decorative layer toward said metal piece is achieved by conducting high-pressure gas into the mold.

15. A method to manufacture a decorated metal piece, comprising:
placing a metal piece to be decorated in a mold;
attaching a decorative non-metal layer to said metal piece in said mold;
uniformly pressing said decorative non-metal layer toward said metal piece by introducing high-pressure gas between said mold and said decorative non-metal layer;
removing said mold from said metal piece fixedly attached with said decorative non-metal layer so as to acquire an intermediary product of said decorated metal piece; and
sealing free edges of said metal piece and said decorative non-metal layer together by applying a sealing layer thereon.

16. The method as claimed in claim 15, wherein an adhesive is applied between said metal piece and said decorative non-metal layer to allow attaching of said decorative non-metal layer to said metal piece in said mold.

17. The method as claimed in claim 16, wherein said adhesive is a hot melt adhesive, and said mold is heated to allow adherence of said decorative non-metal layer to said metal piece by said hot melt adhesive.

18. The method as claimed in claim 15, further comprising trimming said free edges of said metal piece and said decorative non-metal layer when said decorative non-metal layer is attached to said metal piece.

* * * * *